F. A. ELLIS, Jr.
ROPE MEASURING DEVICE.
APPLICATION FILED APR. 30, 1917.
1,340,218.
Patented May 18, 1920.
2 SHEETS—SHEET 2.
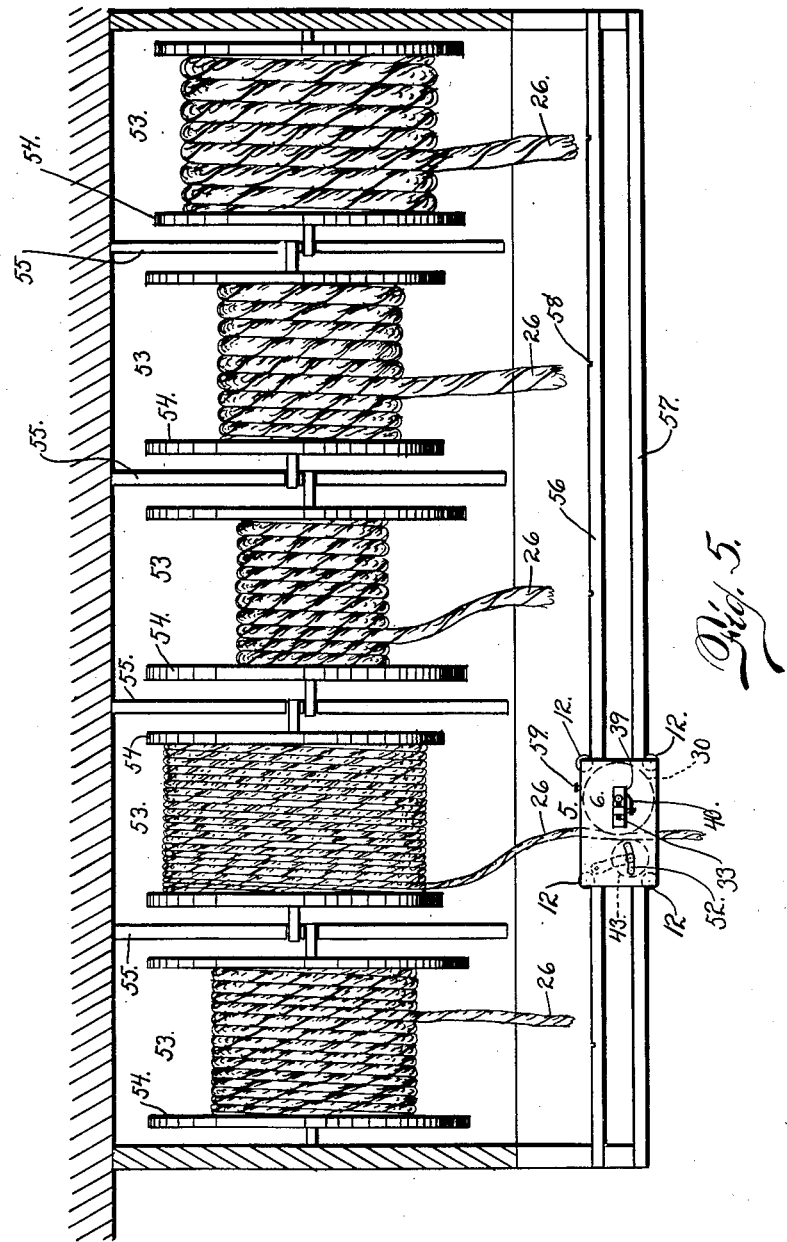
Inventor
Frank A. Ellis Jr.
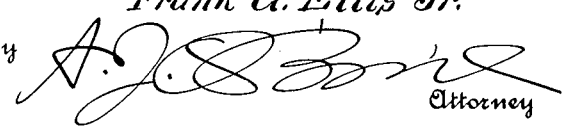
Attorney

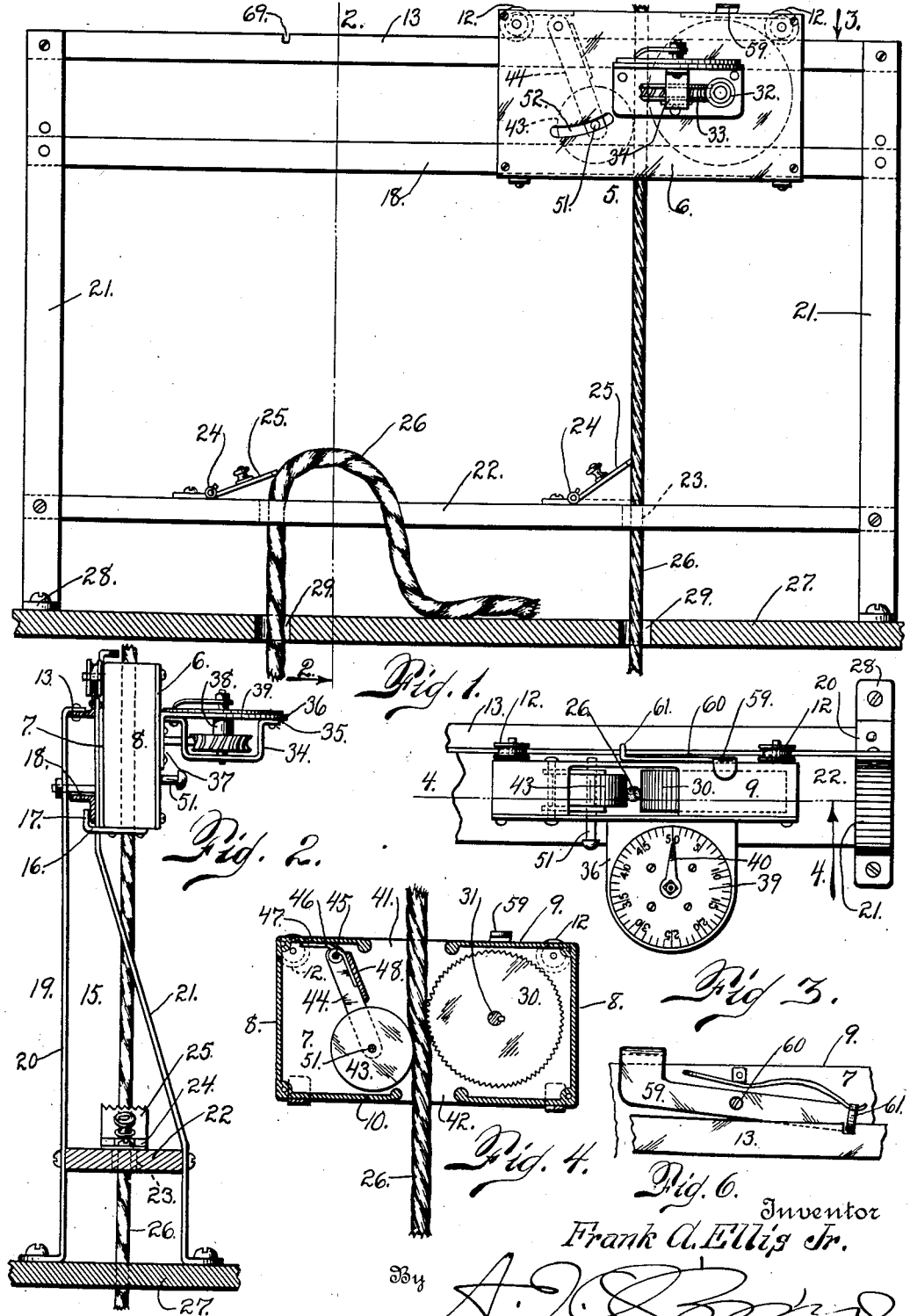

UNITED STATES PATENT OFFICE.

FRANK A. ELLIS, JR., OF DENVER, COLORADO.

ROPE-MEASURING DEVICE.

1,340,218.  Specification of Letters Patent.  Patented May 18, 1920.

Application filed April 30, 1917. Serial No. 165,362.

*To all whom it may concern:*

Be it known that I, FRANK A. ELLIS, Jr., a citizen of the United States, residing at the city and county of Denver and State of Colorado, have invented certain new and useful Improvements in Rope-Measuring Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in rope measuring devices, my object being to provide a construction of this class which shall be well adapted for use in stores where rope is sold at retail, and consequently by the foot. My improvement is well adapted to measure the rope as the latter is drawn through the measuring device which consists of a pair of rollers, one of which is spring actuated while the other is equipped with a worm which in turn engages a worm wheel which operates a pointer, causing the latter to travel around a graduated disk upon which figures or other characters are formed to indicate the number of feet of rope drawn through the device whenever a purchase is made.

The device may be mounted upon a suitable frame which may be secured to the floor of the store and in such position that openings in the floor leading to the basement, register with openings in the base of the frames. The rope in many instances is stored in coils in the basement. The rope from any coil may be passed upwardly from the opening in the floor and through the register opening in the base of the frame-work of my device after which it is drawn upwardly between the tension roller and the measuring roller whereby the pointer is actuated or caused to travel around the disk with the result aforesaid. The frame-work upon which the measuring device proper is mounted, has a bar at the top which contains recesses into which a spring actuated pawl drops when the device is adjusted to bring it into proper alinement with the openings in the base of the frame and in the floor.

Provision is also made for slidably mounting the device upon a track extending in front of a series of compartments in which are journaled spools upon which rope of different sizes is wound. The devices may be locked through the medium of the spring actuated pawl to hold it in position in front of any one of these compartments from which it is desired to remove rope.

Having briefly outlined my improvement, I will proceed to describe the same in detail, reference being made to the accompanying drawing in which is illustrated an embodiment thereof. In this drawing:

Figure 1 is a side elevation of my improved rope measuring structure showing the floor in section where the device is mounted and illustrating the manner of using the device for measuring rope which is taken from a basement or lower floor.

Fig. 2 is a section taken on the line 2—2 Fig. 1 looking toward the right.

Fig. 3 is a top plan view of the measuring device proper showing the frame-work partly broken away.

Fig. 4 is a section taken through the measuring device on the line 4—4, Fig. 3.

Fig. 5 is a horizontal section taken through the walls of a room provided with a number of compartments in which a series of spools are journaled containing ropes of different sizes, my improved measuring device being mounted in position for use.

Fig. 6 is a fragmentary side view of the construction illustrating the spring actuated pawl for retaining the measuring device in the desired position of adjustment upon its track or support, the parts being shown on a larger scale than in the other views.

The same reference characters indicate the same parts in all the views.

Referring first more particularly to the form of construction shown in Figs. 1 to 3 inclusive, let the numeral 5 designate a casing which is composed of front and rear plates 6 and 7 which are suitably spaced by end plates 8 as well as by top and bottom plate members 9 and 10. As shown in the drawing, the upper part of this casing is equipped on the rear side with rollers 12 which engage a top rail 13 of a frame-work 15; while the bottom of the casing is provided with arms 16 (Fig. 2) having upwardly turned ends 17 which engage a lower rail 18 of the supporting structure. By virtue of these features, the casing is adjustable longitudinally on the rails 13 and 18 which are supported at their ends by upright brackets 19 composed of spaced members 20 and 21 which carry a horizontally disposed member 22 which is provided with perforations 23 adjacent which are hinged as shown at 24, rope gripping devices 25 which after the rope as 26 has been drawn through a perforation 23 and through my improved measuring device and cut off, the gripping device will prevent the protruding end from falling back into the basement where the coil is located as heretofore explained. The floor 27 to which the upright structure is secured as shown at 28, is also provided with openings 29 which are arranged to register with the openings 23 in the member 22.

Within the casing 5, is mounted a roller 30 which is made fast upon a spindle 31 journaled in the opposite sides of the casing. The spindle 31 protrudes forwardly beyond the front plate 6 of the casing and is equipped with a worm 32 which engages a worm wheel 33, the latter being mounted in a U-shaped bracket 34 which is secured as shown at 35 to the under-surface of a plate 36 which is disposed at right angles to the wall 6 of the casing and secured thereto as shown at 37. The worm wheel is fast on a vertically disposed spindle 38 which is journaled in the bracket 34 and in the top plate. The upper extremity of this spindle also passes through a disk or dial 39 which is also made fast to the plate 36. To the upper extremity of the spindle above the dial 39, is secured a pointer 40 whose outer extremity is adapted to travel in suitable proximity to numbered graduations formed around the outer edge of the disk for measuring purposes. The peripheral face of the roller 30 is roughened or fashioned in any suitable manner to prevent the rope 26 from slipping thereon during the measuring operation. The casing is provided at the top and bottom with openings 41 and 42 through which the rope may be passed into engagement with the roughened face of the roller 30, which it may be assumed for the purposes of this specification is exactly one foot in circumference, though it will be understood that the circumference of this roller may be equal to any other desired unit of measurement. The rope during the measuring operation is held in coöperative relation with the roughened face of the roller 30 by means of a tension roller 43 which is mounted in the casing on the opposite side of the rope from the roller 30, when the rope is in place. The tension roller is mounted to swing on a depending member 44 whose upper extremity is pivotally connected with the casing as shown at 45, the pivot pin being surrounded by a spring 46, one extremity of which engages the top of the casing as shown at 47, while its opposite extremity engages a stop plate 48 carried by the depending member 44. By virtue of this spring arrangement, the roller 43 is normally thrown toward the roller 30 and caused to grip the rope 26 with sufficient force to maintain the rope in proper coöperative relation with the measuring roller 30 during the operation of passing the rope through the device.

From this it will be understood that when it is desired to measure fifty feet of rope for instance, one end of the rope of the proper size will be passed through two of the openings 29 and 33 formed in the floor and the member 22 respectively. This rope extremity will then be passed up through the opening 42 in the bottom of the casing and between the tension roller 43 and the measuring roller 30, the tension roller being moved toward the left for the purpose through the medium of a pin 51 which is made fast to the tension roller 43 and is movable in a slot 52 formed in the front plate of the casing. As soon as the rope extremity extends above the casing a sufficient distance for the salesman to grasp it, the tension roller 43 is released, the pointer 40 being adjusted to point toward the top of the dial 39. Then as the rope is drawn through the device, the roller 30 will be actuated and the pointer 44 moved around the dial through the instrumentality of the worm gear connection heretofore described. When the pointer reaches the number upon the dial corresponding with the number of feet of rope required, the salesman will cut the rope, in which event it will be grasped by the corresponding gripping device 25 as shown at the left of Fig. 1.

When the rope is arranged in compartments 53 and mounted on spools 54 journaled in partitions 55, my improved device may be arranged in a horizontal position, four grooved rollers 12 being employed to movably support the device upon two rails 56 and 57, the inner rail 56 being recessed as shown at 58 to coöperate with the spring actuated locking pawl 59 which is fulcrumed on the casing as shown at 60, one extremity being bent outwardly as shown at 61 to engage a recess 58 in the form of construction shown in Fig. 5 or a recess or notch 69 in the form of construction shown in Figs. 1 to 3 inclusive.

Where the rope is stored as shown in Fig. 5, the operation of the device is substantially the same as shown in the other views, except that the front and rear walls 6 and 7 of the casing, become top and bottom walls in the form shown in Fig. 5, and the rope when drawn through the device for measuring purposes is in a horizontal position approximately instead of a vertical position. In this form of construction, the special frame-work shown in Figs. 1 and 2 and also the gripping devices 25 are dispensed with.

Normally, the pawl 59 when the device is locked on the track, occupies the position best illustrated in Fig. 6 in which its extremity remote from the track engaging end, is slightly raised or spaced from the casing. This end of the pawl has a thumb piece extending above the casing. When it is desired to release the pawl from engagement of the track, this thumb piece is pressed downwardly against the casing, this movement being sufficient to disengage its track engaging end.

Having thus described by invention, what I claim is:

1. In combination, a support, a track, a measuring device movable on the track, a member parallel to the track and having spaced openings, and rope gripping devices adjacent said openings and coöperating with the edges thereof to hold a rope.

2. In combination, a track, a measuring device movable on the track, a member parallel to the track and having spaced openings for the passage of ropes of varying diameter, rope gripping devices adjacent said openings, and coöperating with the edges thereof to hold a rope, and means carried by the casing for temporarily locking the same on the track when in the desired position of adjustment with reference to said openings.

In testimony whereof I affix my signature, in presence of two witnesses.

FRANK A. ELLIS, Jr.

Witnesses:
  MARY HIGGINS,
  A. EBERT O'BRIEN.